United States Patent [19]

Kishida et al.

[11] Patent Number: 4,550,130

[45] Date of Patent: Oct. 29, 1985

[54] COMPOSITE MATERIAL WITH IMPROVED PROPERTIES

[75] Inventors: Kazuo Kishida, Otake; Isao Sasaki, Hiroshima; Hiroshi Mori, Iwakuni; Yasuaki Ii, Otake, all of Japan

[73] Assignee: Mitsubishi Rayon Co., Ltd., Tokyo, Japan

[21] Appl. No.: 584,400

[22] Filed: Feb. 28, 1984

Related U.S. Application Data

[63] Continuation-in-part of Ser. No. 450,378, Dec. 16, 1982.

[30] Foreign Application Priority Data

Dec. 28, 1981 [JP] Japan ................. 56-212583
May 24, 1982 [JP] Japan ................. 57-87779
May 24, 1982 [JP] Japan ................. 57-87780

[51] Int. Cl.$^4$ .................... C08K 7/00; C08K 7/06; C08K 7/22; C08L 51/06

[52] U.S. Cl. .................... 523/436; 524/404; 524/406; 524/413; 524/420; 524/423; 524/425; 524/430; 524/433; 524/439; 524/442; 524/443; 524/447; 524/448; 524/449; 524/451; 524/452; 524/495; 524/504; 524/533; 525/64; 525/65; 525/66; 525/69

[58] Field of Search .............. 525/263, 301, 65, 66, 525/64, 69, 425; 524/504, 533, 427, 529; 523/436

[56] References Cited

U.S. PATENT DOCUMENTS

| | | | |
|---|---|---|---|
| 3,223,655 | 12/1965 | Murdock | 525/65 |
| 4,017,453 | 4/1977 | Heilman et al. | 525/65 |
| 4,071,494 | 1/1978 | Gaylord | 524/529 |
| 4,147,740 | 4/1979 | Swiger et al. | 525/263 |
| 4,382,128 | 5/1983 | Li | 524/533 |

FOREIGN PATENT DOCUMENTS

| | | | |
|---|---|---|---|
| 53-111805 | 9/1978 | Japan | 524/529 |
| 7211749 | 3/1973 | Netherlands | 524/529 |

*Primary Examiner*—Allan M. Lieberman
*Attorney, Agent, or Firm*—Oblon, Fisher, Spivak, McClelland & Maier

[57] ABSTRACT

A polyolefin resin composition comprising a polyolefin modified with an unsaturated carboxylic acid, at least one member selected from the group consisting of polyepoxides, polyisocyanates, and polyamines, and a reinforcement.

15 Claims, No Drawings

COMPOSITE MATERIAL WITH IMPROVED PROPERTIES

CROSS REFERENCE TO THE RELATED APPLICATION

This is a continuation-in-part application of application Ser. No. 450,378 filed on Dec. 16, 1982, now pending.

FIELD OF THE INVENTION

The present invention relates to a composite material with improved properties which can provide a molded product having excellent various properties.

BACKGROUND OF THE INVENTION

Thermoplastic composite materials have excellent mechanical and electrical properties, and investigations for use as industrial materials have recently been developed rapidly. Of polymers constituting the composite materials, polyolefins such as polyethylene, polypropylene, and so forth have characteristics such as small specific gravity, good moldability and processability, excellent chemical resistance, and so forth, and applications of the thermoplastic composite materials comprising polyolefins as a matrix will now increase.

However, since polyolefins constituting the thermoplastic composite materials are nonpolar polymers, they do not have a satisfactory affinity for glass fibers, carbon fibers, carbon black, mica, talc, alumina fibers, silicon carbide fibers, aromatic polyamide fibers, and so forth which are used as a reinforcement. Therefore, a thermoplastic composite material having a further improved reinforcing effect has been demanded.

Many investigations have been made to develop a thermoplastic composite material satisfying the above requirement.

For example, Japanese Patent Application (OPI) No. 74649/1977 (the term "OPI" as used herein refers to a "published unexamined Japanese patent application") describes a material prepared by adding 0.2 to 2 wt% of polyacrylic acid to a composite material composed of 50 to 95 parts by weight of a polyolefin and 5 to 50 parts by weight of an inorganic filler. However, this composite material cannot be said to possess sufficiently improved properties because the affinity of the matrix polymer for the filler has not yet been improved. Japanese Patent Application (OPI) No. 50041/1980 and U.S. Pat. No. 3,862,265 describe a composite material composed of a graft polyolefin and an inorganic filler which is obtained by blending an unsaturated carboxylic acid, a polyolefin, and an inorganic filler, followed by subjecting the blend to a reaction under heating and mixing in an extruder. This composite material has good affinity of the graft polyolefin for the inorganic filler but has not a sufficient flowability since it contains inorganic fibers. Therefore, a molded product prepared from this composite material has not a sufficient impact strength. Thus, composite materials having improved properties are strongly desired.

SUMMARY OF THE INVENTION

Accordingly, an object of the present invention is to provide a thermoplastic composite material which can provide a molded product having excellent mechanical properties (particularly, impact strength), a high flexial modulus a small specific gravity and a good water repllency.

Another object of the present invention is to provide a composite material having a good moldability due to its excellent flowability.

The composite material of the present invention comprises a modified polyolefin (i.e., a polyolefin modified with an unsaturated carboxylic acid), a reinforcement, and at least one polyfunctional compound selected from the group consisting of a polyfunctional epoxide, a polyfunctional amino compound, and a polyfunctional polyisocyanate compound.

DETAILED DESCRIPTION OF THE INVENTION

The modified polyolefin used in the present invention can be obtained by graft-polymerizing an unsaturated carboxylic acid onto a polyolefin and has an excellent affinity for reinforcements as compared with unmodified polyolefins.

Examples of polyolefins used for preparation of the modified polyolefin include polyethylene, polypropylene, poly(4-methylpentene-1), ethylene/vinyl acetate copolymer, ethylene/ethyl acrylate copolymer, ethylene/propylene/diene copolymer, and so forth. When polypropylene is used, a composite material having particularly various excellent characteristics can be prepared.

The modifier used for preparations of the modified polyolefin is unsaturated carboxylic acids and examples thereof include acrylic acid, methacrylic acid, itaconic acid, maleic acid, and anhydrides of these acids. The amount of these modifiers used is 0.05 to 0.8 part by weight, preferably 0.1 to 0.6 part by weight, per 100 parts by weight of the polyolefin.

A modified polyolefin prepared using a small amount of the modifier has not a sufficient affinity for the reinforcement, making it difficult to prepare a composite material having excellent properties. On the other hand, when a modified polyolefin is prepared using a large amount of the modifier, modification of the polyolefin does not proceed sufficiently, and a modified polyolefin contains a large amount of unreacted modifier. Such a product tends to deteriorate with the passage of time.

The modified polyolefin can be prepared by mixing a polyolefin, a modifier, and a catalyst in predetermined proportions and reacting the resulting mixture at 150° to 280° C. for 1 to 20 minutes. When the reaction temperature and/or the reaction time exceed(s) the abovedescribed range(s), the modified polyolefin obtained shows unfavorable coloring or unnecessary thermal decomposition.

Examples of the catalysts used for the preparation of the modified polyolefin include benzoyl peroxide, lauroyl peroxide, and ketal or dialkyl peroxides which have a decomposition temperature necessary for attaining the half life of 10 hours of at least 80° C. Specific examples of the ketal or dialkyl peroxide catalysts include 1,1-bis(t-butylperoxy)cyclohexane, n-butyl 4,4-bis(t-butylperoxy)valerate, 1,1-bis-(t-butylperoxy)-3,3,5-trimethylcyclohexane, 2,2-bis(t-butylperoxy)butane, 2,2-bis(t-butylperoxy)octane, dicumyl peroxide, t-butylcumyl peroxide, α,α'-bis(t-butylperoxyisopropyl)benzene, 2,5-dimethyl-2,5-di(t-butylperoxy)hexane, and 2,5-dimethyl-2,5-di(t-butylperoxy)hexyne-3.

When the modified polyolefin is prepared using ketal peroxides or dialkyl peroxides having a decomposition temperature necessary for attaining the half life of 10 hours of at least 80° C., it exhibits a more effective molecular weight-lowering effect as compared with the modified polyolefin prepared using other catalysts. Accordingly, the composite material of the present invention prepared using the modified polyolefin has excellent moldability. Further, in crystallization of the polymer in the process for molding of the composite material of the present invention, the modified polyolefin prepared by using the specified ketal peroxides or dialkyl peroxides and benzoyl peroxide in a weight ratio of 10/1 to 1/10, preferably 1/6 to 6/1, exhibits an effect of inhibiting the growth of spherulites and, as a result, a composite material having good characteristics (a spherulite size of 50μ or less, preferably 5 to 30μ) can be obtained.

The amount of the catalyst used is 0.03 to 3 parts by weight, preferably 0.05 to 1 part by weight, per 100 parts by weight of the polyolefin.

As a modification reaction of the polyolefins, a solution reaction process using a solvent as a reaction medium or a method in which the reaction is conducted in a heat-melting state can be employed. From the standpoint of prevention of unnecessary coloring of the modified polyolefin obtained, prevention of unnecessary lowering of the molecular weight of the polyolefin, and the choice of an appropriate reaction time, it is preferred to employ a heat-melting reaction using an extruder as a reactor.

Polyfunctional epoxy compounds used in the present invention are compounds having two or more epoxy groups in the molecule. Examples thereof include a bisphenol A type epoxy compound, a bisphenol F type epoxy compound, an aliphatic ether type epoxy compound, a novolak type epoxide, an isocyanurate type epoxide and so forth. Specific examples thereof include condensates between bisphenol A and epichlorohydrin; polyglycidyl ethers of polyols such as ethylene glycol, propylene glycol, polyethylene glycol, glycerol, neopentyl glycol, trimethylolpropane, and sorbitol; triglycidyl isocyanurate, N-methyl-N',N''-diglycidyl isocyanurate, and triglycidyl cyanurate. The molecular weight of these polyfunctional epoxies is, though not particularly limited, about 4,000 or less.

Polyfunctional amines used in the present invention are compounds having two or more amino groups in the molecule. Specific examples thereof include hexamethylenediamine, tetramethylenediamine, methaxylenediamine, diaminodiphenylmethane, diaminodiphenyl sulfone, 3,3'-diaminobenzidine, isophthalic acid hydrazide, diaminodiphenyl ether, nanomethylenediamine, and diethylenetetramine.

Polyfunctional isocyanates are compounds having two or more isocyanate groups in the molecule. Examples thereof include tetramethylene diisocyanate, toluidine diisocyanate, diphenylmethane diisocyanate, naphthalene diisocyanate, and their polyisocyanates obtained by extending them with a chain-extending agent. Of these polyfunctional compounds, polyepoxides having a cyanuric or isocyanuric ring have high reactivity toward the modified polyolefin in the process of preparing the composite material of the present invention and a molding product prepared from the composite material thus-obtained has more excellent impact strength as compared with other molded products.

Polyfunctional epoxies, polyfunctional amines, and polyfunctional isocyanates can be used alone or in combination, the amount thereof is each 0.03 to 5 wt% per the weight of the modified polyolefin but the total amount does not exceed 10 wt% per the weight of the modified polyolefin.

Molded products prepared from the composite material containing at least one of those polyfunctional amines, polyfunctional isocyanates, and polyfunctional epoxides of the present invention have an excellent strength characteristic as compared with molded products prepared from composite materials containing no those polyfunctional compounds.

Reinforcements used in the present invention are fibrous materials such as glass fibers, carbon fibers, graphite fibers, aromatic polyamide fibers, silicon carbide fibers, polysulfone type fibers, polyether ketone fibers, alumina fibers, potassium titanate fibers, asbestos fibers, boron fibers, metal fibers, and so forth. Fibers having the length of 5 mm or less, preferably 0.01 to 3 mm, are preferred.

As other reinforcements, powdery or flaky materials such as glass flakes, talc, mica, kaolin, clay, diatomaceous earth, calcium carbonate, calcium sulfate, magnesium oxide, carbon black, titanium oxide, metal powders, alumina, graphite, white carbon, wollastonite, molybdenum disulfide, and tungsten disulfide can be used. Those reinforcements are incorporated in the modified polyolefin alone or in combination thereof in an amount of 5 to 400 wt% per the weight of the modified polyolefin. If the amount of the reinforcement is too small, a sufficient reinforcing effect, high flexial modulus and high strength cannot be obtained. On the other hand, if the amount of the reinforcement is too large, moldability of the composite material is remarkable reduced and the mechanical properties of a molded product prepared from the composite material tend to deteriorate.

Other thermoplastic plastics, for example, engineering plastics such as polyamides, unmodified polyolefins, polyesters, polycarbonates, polyacetals, and polysulfones can be incorporated into the composite material of the present invention, if desired.

The composite material of the present invention is prepared by blending a modified polyolefin, at least one compound selected from the group consisting of polyfunctional epoxides, polyfunctional amines, and polyfunctional isocyanates, and a reinforcement in the predetermined proportions. This composite material can be molded into the desired molded product by an injection molding method or the like.

Moldability of the composite material of the present invention is superior to that of similar kinds of conventional composite materials. Thus, it is believed that a molded product prepared from the composite material of the present invention has sufficiently improved impact strength as compared with that prepared from similar kinds of conventional composite materials.

The present invention will now be explained in detail by reference to the following non-limiting examples. Unless otherwise indicated, all percents, parts, ratios and the like are by weight.

EXAMPLE 1

To 100 parts by weight of polypropylene powders having an inherent viscosity of 1.5 (measured in a tetralin solution at 135° C.) were added modifiers and peroxides with the amounts as shown in Table 1, and the mixture was blended in the Henschel mixer. The mixture was then fed into an extruder reactor of 30 $\phi$ and L/D=25, and modified in a mixed state under heat-melting at a reaction temperature of 230° C. for a reaction time of 7 minutes. The unreacted modifier was removed by reducing the pressure of the vent portion of the extruder, and then the reaction mixture was extruded into pellets to give modified polyolefins.

To 100 parts by weight of the resulting modified polyolefin pellets were each added prescribed amounts of reinforcements and polyfunctional compounds as shown in Table 1. The mixture was blended in a tumbler and melt mixed in an extruder, and extruded therefrom to give pellets of composite materials.

These composite materials were formed into 3 kinds of molded products, viz., plates of No. 1 dumbbell, 125×12.5×3.2 (mm), and 125×12.5×6.4 (mm) using a screw on-line type injection machine under molding conditions of a cylinder temperature of 220° C. and a mold temperature of 60° C.

The results obtained by measuring fabrication properties of the composite materials and mechanical properties of the molded products therefrom under the following conditions are shown in Table 1.

Melt Flow Index (molding flow index): ASTM-D-1238, load 2.16 kg, temperature 230° C.

Izod Impact Strength: ASTM-D-256.

Heat Distortion Temperature (hereinafter referred to as HDT): ASTM-D-648.

Ratio of improvement in strength

Ratio of improvement in strength =

$$\frac{\text{Bending strength of molded product prepared from composite material of the present invention}}{\text{Bending strength of molded product prepared from composite material containing no polyfunctional compound}}$$

TABLE 1

|  | 1 | 2 | 3 | 4 | 5 | 6 | 7 |
|---|---|---|---|---|---|---|---|
| Composition of composite material | | | | | | | |
| Polypropylene Parts by weight | 100 | 100 | 100 | 100 | 100 | 100 | 100 |
| Peroxide | | | | | | | |
| Kind | — | Benzoyl peroxide | — | Benzoyl peroxide | Benzoyl peroxide | Benzoyl peroxide | Benzoyl peroxide |
| Parts by weight | — | 0.3 | — | 0.3 | 0.3 | 0.3 | 0.3 |
| Modifier | | | | | | | |
| Kind | — | Maleic anhydride | — | Maleic anhydride | Maleic anhydride | Maleic anhydride | Acrylic acid |
| Parts by weight | — | 0.3 | — | 0.3 | 0.3 | 0.3 | 0.3 |
| Polyfunctional compound | | | | | | | |
| Kind | — | — | Hexamethylene diamine | Hexamethylene diamine | Hexamethylene diamine | diamino diphenyl ether | — |
| Parts by weight | — | — | 0.3 | 0.3 | 0.3 | 0.5 | — |
| Reinforcement | | | | | | | |
| Kind | Carbon fiber | Carbon fiber | Carbon fiber | Carbon fiber | Carbon fiber | Carbon fiber | Carbon fiber |
| Parts by weight | 25 | 25 | 25 | 25 | 25 | 25 | 25 |
| Mechanical property of molded product | | | | | | | |
| Flexial strength (kg/cm$^2$) | 770 | 1,140 | 820 | 1,470 | 1,540 | 1,460 | 1,160 |
| Flexial modulus (× 10$^4$ kg/cm$^2$) | 8.8 | 8.8 | 8.8 | 8.8 | 8.7 | 8.7 | 8.6 |
| Izod impact strength (kg-cm/cm$^2$) | 15 | 18 | 16 | 31 | 33 | 28 | 17 |
| HDT (°C.) | 145 | 148 | 145 | 147 | 143 | 145 | 148 |
| Ratio of improvement in strength (ratio) | 1.0 | 1.5 | 1.1 | 1.9 | 2.0 | 1.9 | 1.5 |
| Remark | Comparative Example | " | " | Invention | Invention | Invention | Comparative Example |

| | Experiment No. | | | | | | |
|---|---|---|---|---|---|---|---|
|  | 8 | 9 | 10 | 11 | 12 | 13 | 15 |
| Composition of composite material | | | | | | | |
| Polypropylene Parts by weight | 100 | 100 | 100 | 100 | 100 | 100 | 100 |
| Peroxide | | | | | | | |
| Kind | Benzoyl peroxide | Benzoyl peroxide | Benzoyl peroxide | Benzoyl peroxide | Benzoyl peroxide | Benzoyl peroxide | Benzoyl peroxide |
| Parts by weight | 1.0 | 0.3 | 1.0 | 0.3 | 0.3 | 0.3 | 0.3 |
| Modifier | | | | | | | |
| Kind | Acrylic acid | Acrylic acid | Acrylic acid | Maleic anhydride | Maleic anhydride | Maleic anhydride | Maleic anhydride |
| Parts by weight | 0.7 | 0.3 | 0.7 | 0.3 | 0.3 | 0.3 | 0.3 |
| Polyfunctional compound | | | | | | | |
| Kind | — | Hexamethylene diamine | Hexamethylene diamine | 2,4-Toluilene diisocyanate | 4,4'-Diphenylmethane diisocyanate | Triglycidyl isocyanurate | Bisphenol A diglycidyl ether |
| Parts by weight | — | 0.3 | 0.3 | 0.3 | 0.3 | 0.3 | 0.3 |

TABLE 1-continued

| | Experiment No. | | | | | | |
|---|---|---|---|---|---|---|---|
| | 10 | 11 | 12 | 13 | 14 | 15 | |
| Reinforcement | | | | | | | |
| Kind | Carbon fiber | Carbon fiber | Carbon fiber | Carbon fiber | Carbon fiber | Carbon fiber | Carbon fiber |
| Parts by weight | 25 | 25 | 25 | 25 | 25 | 25 | 25 |
| Mechanical property of molded product | | | | | | | |
| Flexial strength (kg/cm$^2$) | 1,230 | 1,460 | 1,570 | 1,530 | 1,550 | 1,580 | 1,460 |
| Flexial modulus ($\times 10^4$ kg/cm$^2$) | 8.6 | 8.7 | 8.8 | 8.4 | 8.6 | 8.9 | 8.6 |
| Izod impact strength (kg-cm/cm$^2$) | 19 | 29 | 27 | 34 | 33 | 32 | 28 |
| HDT (°C.) | 147 | 147 | 149 | 146 | 145 | 151 | 150 |
| Ratio of improvement in strength (ratio) | 1.6 | 1.9 | 2.0 | 2.0 | 2.0 | 2.1 | 1.9 |
| Remark | Comparative Example | Invention | Invention | Invention | Invention | Invention | Invention |

| | Experiment No. | | | | | | |
|---|---|---|---|---|---|---|---|
| | 16 | 17 | 18 | 19 | 20 | 21 | 22 |
| Composition of composite material | | | | | | | |
| Polypropylene Parts by weight | 100 | 100 | 100 | 100 | 100 | 100 | 100 |
| Peroxide | | | | | | | |
| Kind | Benzoyl peroxide | Benzoyl peroxide | Benzoyl peroxide | Benzoyl peroxide | Benzoyl peroxide | Benzoyl peroxide | — |
| Parts by weight | 0.3 | 0.3 | 0.3 | 0.3 | 0.3 | 0.3 | — |
| Modifier | | | | | | | |
| Kind | Maleic anhydride | Maleic anhydride | Maleic anhydride | Maleic anhydride | Acrylic acid | Acrylic acid | — |
| Parts by weight | 0.3 | 0.3 | 0.3 | 0.3 | 0.3 | 0.3 | — |
| Polyfunctional compound | | | | | | | |
| Kind | Neopentylglycol diglycidyl ether | — | Triglycidyl isocyanurate | Hexamethylene diamine | Hexamethylene diamine | Triglycidyl isocyanurate | — |
| Parts by weight | 0.3 | — | 0.3 | 0.3 | 0.3 | 0.3 | — |
| Reinforcement | | | | | | | |
| Kind | Carbon fiber | Glass fiber | Glass fiber | Glass fiber | Glass fiber | Carbon fiber | Talc |
| Parts by weight | 25 | 25 | 25 | 25 | 25 | 25 | 25 |
| Mechanical property of molded product | | | | | | | |
| Flexial strength (kg/cm$^2$) | 1,500 | 1,080 | 1,330 | 1,280 | 1,250 | 1,600 | 430 |
| Flexial modulus ($\times 10^4$ kg/cm$^2$) | 8.7 | 5.3 | 5.5 | 5.4 | 5.3 | 8.5 | 4.3 |
| Izod impact strength (kg-cm/cm$^2$) | 30 | 20 | 25 | 27 | 28 | 30 | 10 |
| HDT (°C.) | 151 | 145 | 144 | 145 | 148 | 149 | 80 |
| Ratio of improvement in strength (ratio) | 1.9 | 1.2 | 1.5 | 1.5 | 1.4 | 2.1 | 1.0 |
| Remark | Invention | Comparative Example | Invention | Invention | Invention | Invention | Comparative Example |

| | Experiment No. | | | | | |
|---|---|---|---|---|---|---|
| | 23 | 24 | 25 | 26 | 27 | 28 |
| Composition of composite material | | | | | | |
| Polypropylene Parts by weight | 100 | 100 | 100 | 100 | 100 | 100 |
| Peroxide | | | | | | |
| Kind | Benzoyl peroxide | Benzoyl peroxide | Benzoyl peroxide | Benzoyl peroxide | Benzoyl peroxide | Benzoyl peroxide |
| Parts by weight | 0.3 | 0.3 | 0.3 | 0.3 | 0.3 | 0.7 |
| Modifier | | | | | | |
| Kind | Maleic anhydride | Maleic anhydride | Maleic anhydride | Maleic anhydride | Maleic anhydride | Maleic anhydride |
| Parts by weight | 0.3 | 0.3 | 0.3 | 0.3 | 0.3 | 0.7 |
| Polyfunctional compound | | | | | | |
| Kind | — | 4,4-Diphenylmethylene diisocyanate | Triglycidyl isocyanurate | Triglycidyl isocyanurate | Triglycidyl isocyanurate | Triglycidyl isocyanurate |
| Parts by weight | — | 0.5 | 0.3 | 0.3 | 0.3 | 0.3 |
| Reinforcement | | | | | | |
| Kind | Talc | Talc | Talc | Glass fiber | Talc/carbon fiber = 1/1 | Carbon fiber |
| Parts by weight | 25 | 25 | 25 | 25 | 50 | 25 |
| Mechanical property of | | | | | | |

TABLE 1-continued

| molded product | | | | | | |
|---|---|---|---|---|---|---|
| Flexial strength (kg/cm$^2$) | 500 | 560 | 540 | 1,320 | 1,530 | 1,640 |
| Flexial modulus ($\times 10^4$ kg/cm$^2$) | 4.3 | 4.3 | 4.5 | 5.4 | 10.1 | 8.2 |
| Izod impact strength (kg-cm/cm$^2$) | 10 | 19 | 17 | 27 | 29 | 32 |
| HDT (°C.) | 80 | 82 | 80 | 148 | 149 | 149 |
| Ratio of improvement in strength (ratio) | 1.0 | 1.3 | 1.3 | 1.5 | 2.0 | 2.1 |
| Remark | Comparative Example | Invention | Invention | Invention | Invention | Invention |

| | Experiment No. | | | | | |
|---|---|---|---|---|---|---|
| | 29 | 30 | 31 | 32 | 33 | 34 |
| Composition of composite material | | | | | | |
| Polypropylene Parts by weight | 100 | 100 | 100 | 100 | 100 | 100 |
| Peroxide | | | | | | |
| Kind | 1,1-Bis(t-butylperoxy)-3,3,5-trimethyl-cyclohexane | 2,5-Dimethyl-2,5-di(t-butylperoxy)-hexyne-3 | Benzoyl peroxide | *1 | *2 | *2 |
| Parts by weight | 0.2 | 0.2 | 0. | 0.2 | 0.2 | 0.2 |
| Modifier | | | | | | |
| Kind | Maleic anhydride | Maleic anhydride | Maleic anhydride | Maleic anhydride | Maleic anhydride | Maleic anhydride |
| Parts by weight | 0.3 | 0.3 | 0.3 | 0.3 | 0.3 | 0.3 |
| Polyfunctional compound | | | | | | |
| Kind | Triglycidyl isocyanurate | Triglycidyl isocyanurate | Triglycidyl isocyanurate | Triglycidyl isocyanurate | Triglycidyl isocyanurate | Triglycidyl isocyanurate |
| Parts by weight | 0.3 | 0.3 | 0.3 | 0.3 | 0.3 | 0.3 |
| Reinforcement | | | | | | |
| Kind | Carbon fiber | Carbon fiber | Carbon fiber | Carbon fiber | Carbon fiber | Carbon fiber |
| Parts by weight | 25 | 25 | 25 | 25 | 25 | 25 |
| Mechanical property of molded product | | | | | | |
| Flexial strength (kg/cm$^2$) | 1,480 | 1,450 | 770 | 1,500 | 1,560 | 1,470 |
| Flexial modulus ($\times 10^4$ kg/cm$^2$) | 8.7 | 8.7 | 8.4 | 8.6 | 8.7 | 8.6 |
| Izod impact strength (kg-cm/cm$^2$) | 29 | 20 | 11 | 35 | 33 | 17 |
| HDT (°C.) | 144 | 146 | 141 | 148 | 149 | 145 |
| Ratio of improvement in strength (ratio) | 1.9 | 1.4 | 1.0 | 1.9 | 2.0 | 1.9 |
| Remark | Invention | Invention | Comparative Example | Invention | Invention | Invention |
| MFI (g/10 min) | | 39.9 | 6.1 | | | |
| Spherical size ($\mu$) | 100 | 100 | 100 | 10 | 10 | 100 |
| Moldability into flat plate 1 mm thick | Better | Best | Bad | Better | Better | Better |

| | Experiment No. | | | | | |
|---|---|---|---|---|---|---|
| | 35 | 36 | 37 | 38 | 39 | 40 |
| Composition of composite material | | | | | | |
| Polypropylene Parts by weight | 100 | 100 | 100 | 100 | 100 | 100 |
| Peroxide | | | | | | |
| Kind | — | Benzoyl peroxide | Benzoyl peroxide | Benzoyl peroxide | *1 | *1 |
| Parts by weight | — | 0.2 | 0.2 | 0.2 | 0.2 | 0.2 |
| Modifier | | | | | | |
| Kind | — | Maleic anhydride | Maleic anhydride | Maleic anhydride | Maleic anhydride | Maleic anhydride |
| Parts by weight | — | 0.3 | 0.3 | 0.3 | 0.3 | 0.3 |
| Polyfunctional compound | | | | | | |
| Kind | Triglycidyl isocyanurate | Triglycidyl isocyanurate | Hexa-methylene diamine | Bisphenol A diglycidyl ether | Triglycidyl isocyanurate | Hexamethylene diamine |
| Parts by weight | 0.3 | 0.6 | 0.6 | 0.6 | 0.6 | 0.6 |
| Reinforcement | | | | | | |
| Kind | Carbon fiber | Carbon fiber | Carbon fiber | Carbon fiber | Carbon fiber | Carbon fiber |
| Parts by weight | 25 | 25 | 25 | 25 | 25 | 25 |
| Mechanical property of | | | | | | |

TABLE 1-continued

| molded product | | | | | | |
|---|---|---|---|---|---|---|
| Flexial strength (kg/cm²) | 750 | 1,750 | 1,520 | 1,510 | 1,700 | 1,480 |
| Flexial modulus (× 10⁴ kg/cm²) | 8.3 | 8.6 | 8.5 | 8.7 | 8.7 | 8.6 |
| Izod impact strength (kg-cm/cm²) | 13 | 40 | 33 | 30 | 38 | 30 |
| HDT (°C.) | 141 | 145 | 144 | 146 | 145 | |
| Ratio of improvement in strength (ratio) | 1.0 | 2.3 | 2.0 | 2.0 | 2.2 | 1.9 |
| Remark | Comparative Example | Invention | Invention | Invention | Invention | Invention |
| MFI (g/10 min) | 5.6 | | | | | |
| Spherical size (μ) | 100 | 10 | 10 | 10 | 10 | 10 |
| Moldability into flat plate 1 mm thick | Bad | Good | Good | Good | Best | Best |

| | Experiment No. | | | | | |
|---|---|---|---|---|---|---|
| | 41 | 42 | 43 | 44 | 45 | 46 |
| Composition of composite material | | | | | | |
| Polypropylene Parts by weight | 100 | 100 | 100 | 100 | 100 | 100 |
| Peroxide | | | | | | |
| Kind | *1 | — | Benzoyl peroxide | — | Benzoyl peroxide | Benzoyl peroxide |
| Parts by weight | 0.2 | — | 0.3 | — | 0.3 | 0.3 |
| Modifier | | | | | | |
| Kind | Maleic anhydride | — | Maleic anhydride | — | Maleic anhydride | Maleic anhydride |
| Parts by weight | 0.3 | — | 0.3 | — | 0.3 | 0.3 |
| Polyfunctional compound | | | | | | |
| Kind | Bisphenol A diglycidyl ether | — | — | Triglycidyl isocyanurate | Triglycidyl isocyanurate | Triglycidyl isocyanurate |
| Parts by weight | 0.6 | — | — | 0.3 | 0.3 | 3.0 |
| Reinforcement | | | | | | |
| Kind | Carbon fiber | Carbon fiber | Carbon fiber | Carbon fiber | Carbon fiber | Carbon fiber |
| Parts by weight | 25 | 100 | 100 | 100 | 100 | 100 |
| Mechanical property of molded product | | | | | | |
| Flexial strength (kg/cm²) | 1,470 | 990 | 1,450 | 950 | 1,950 | 2,110 |
| Flexial modulus (× 10⁴ kg/cm²) | 8.6 | 21.5 | 22.0 | 21.8 | 22.2 | 27.3 |
| Izod impact strength (kg-cm/cm²) | 29 | 10 | 17 | 11 | 28 | 25 |
| HDT (°C.) | 146 | 149 | 148 | 148 | 148 | 149 |
| Ratio of improvement in strength (ratio) | 1.9 | 1.0 | 1.5 | 1.0 | 2.0 | — |
| Remark | Invention | Comparative Example | " | " | Invention | Invention |
| MFI (g/10 min) | 10 | 3 | 6 | 3 | 5 | |
| Sperical size (μ) | 10 | | | | | |
| Moldability into flat plate 1 mm thick | Best | | | | | |

| | Experiment No. | | | | | |
|---|---|---|---|---|---|---|
| | 47 | 48 | 49 | 50 | 51 | 52 |
| Composition of composite material | | | | | | |
| Polypropylene Parts by weight | 100 | 100 | 100 | 100 | 100 | 100 |
| Peroxide | | | | | | |
| Kind | Benzoyl peroxide | Benzoyl peroxide | Benzoyl peroxide | — | — | — |
| Parts by weight | 0.3 | 0.3 | 0.3 | — | — | — |
| Modifier | | | | | | |
| Kind | Acrylic acid | Maleic anhydride | Maleic anhydride | — | Maleic anhydride | — |
| Parts by weight | 0.3 | 0.3 | 0.3 | — | 0.3 | — |
| Polyfunctional compound | | | | | | |
| Kind | Triglycidyl isocyanurate | Hexamethylene diamine | 4,4'-diphenyl methane diisocyanate | — | — | Triglycidyl isocyanurate |
| Parts by weight | 0.3 | 0.3 | 0.3 | — | — | 0.3 |
| Reinforcement | | | | | | |

TABLE 1-continued

| Kind | Carbon fiber | Carbon fiber | Carbon fiber | Glass fiber | Glass fiber | Glass fiber |
|---|---|---|---|---|---|---|
| Parts by weight | 100 | 100 | 100 | 100 | 100 | 100 |
| Mechanical property of molded product | | | | | | |
| Flexial strength (kg/cm$^2$) | 1,900 | 1,870 | 1,810 | 1,000 | 1,240 | 970 |
| Flexial modulus ($\times 10^4$ kg/cm$^2$) | 22.0 | 21.6 | 22.3 | 15.0 | 15.2 | 15.1 |
| Izod impact strength (kg-cm/cm$^2$) | 27 | 26 | 28 | 12 | 19 | 13 |
| HDT (°C.) | 149 | 148 | 147 | 148 | 149 | 148 |
| Ratio of improvement in | 1.9 | 1.9 | 1.8 | 1.0 | 1.2 | 1.0 |
| Remark | Invention | Invention | Invention | Comparative Example | Comparative Example | Comparative Example |

| | Experiment No. | | | | | |
|---|---|---|---|---|---|---|
| | 53 | 54 | 55 | 56 | 57 | 58 |
| Composition of composite material | | | | | | |
| Polypropylene Parts by weight | 100 | 100 | 100 | 100 | 100 | 100 |
| Peroxide | | | | | | |
| Kind | Benzoyl peroxide | 1,1-Bis(t-butylperoxy)-3,3,5-trimethyl-cyclohexane | *1 | — | Benzoyl peroxide | Benzoyl peroxide |
| Parts by weight | 0.3 | 0.3 | 0.3 | — | 0.3 | 0.3 |
| Modifier | | | | | | |
| Kind | Maleic anhydride | Maleic anhydride | Maleic anhydride | — | Maleic anhydride | Maleic anhydride |
| Parts by weight | 0.3 | 0.3 | 0.3 | — | 0.3 | 0.3 |
| Polyfunctional compound | | | | | | |
| Kind | Triglycidyl isocyanurate | Triglycidyl isocyanurate | Triglycidyl isocyanurate | — | — | Triglycidyl isocyanurate |
| Parts by weight | 0.3 | 0.3 | 0.3 | — | — | 0.3 |
| Reinforcement | | | | | | |
| Kind | Glass fiber | Carbon fiber | Carbon fiber | Calcium carbonate | Calcium carbonate | Calcium carbonate |
| Parts by weight | 100 | 100 | 100 | 100 | 100 | 100 |
| Mechanical property of molded product | | | | | | |
| Flexial strength (kg/cm$^2$) | 1,590 | 1,850 | 1,920 | 390 | 510 | 600 |
| Flexial modulus ($\times 10^4$ kg/cm$^2$) | 15.0 | 22.0 | 22.1 | 5.4 | 5.4 | 5.3 |
| Izod impact strength (kg-cm/cm$^2$) | 24 | 22 | 27 | 8 | 9 | 16 |
| HDT (°C.) | 149 | 148 | 149 | 80 | 80 | 80 |
| Ratio of improvement in strength (ratio) | 1.6 | 1.9 | 1.9 | 1.0 | 1.3 | 1.5 |
| Remark | Invention | Invention | Invention | Comparative Example | Comparative Example | Invention |
| MFI (g/10 min) | | 14 | 12 | | | |

Notes
*1: A mixture of benzoyl peroxide and 1,1-bis(t-butylperoxy)-3,3,5-trimethylcyclohexane (1:1)
*2: A mixture of benzoyl peroxide and 2,5-dimethyl-2,5-di(t-butylperoxy)hexyne-3 (1:1)

EXAMPLE 2

To 100 parts by weight of polypropylene powders having an inherent viscosity of 2.0 (measured in a tetralin solution of 135° C.) were each added peroxides as shown in Table 2 and 0.3 part of maleic anhydride as a modifier, and the mixture was blended uniformly in the Henschel mixer. The mixture was then subjected to a heat-melting reaction under conditions of a reaction temperature of 250° C. and a reaction time period of 7 minutes.

The results obtained by measuring the inherent viscosity of modified polypropylenes thus-obtained are shown in Table 2 below.

TABLE 2

| | Inherent Viscosity Amount of Peroxide Added (parts) | | | | | |
|---|---|---|---|---|---|---|
| Peroxide | 0 | 0.05 | 0.1 | 0.3 | 0.4 | 0.8 |
| Benzoyl peroxide | 1.75 | 1.73 | 1.70 | 1.62 | 1.6 | 1.56 |
| 1,1-Bis(t-butylperoxy)-3,3,5-trimethyl cyclohexane | 1.75 | 1.45 | 1.3 | 1.00 | 0.95 | — |
| Dicumyl peroxide | 1.75 | 1.08 | 1.32 | 1.08 | 0.98 | — |
| Benzoyl peroxide/1,1-Bis(t-butylperoxy)-3,3,5-trimethyl cyclohexane (1:1 weight ratio mixture) | 1.75 | — | 1.31 | 1.09 | — | — |

While the invention has been described in detail and with reference to specific embodiments thereof, it will be apparent to one skilled in the art that various changes and modifications can be made therein without departing from the spirit and scope thereof.

What is claimed is:

1. A polyolefin resin composition comprising:
   (a) a polyolefin selected from the group consisting of polyethylene, polypropylene, poly(4-methylpentene-1), ethylene/vinyl acetate copolymer, ethylene/ethylacrylate copolymer, and ethylene/propylene/diene copolymer modified with from 0.05 to 0.8 parts by weight per 100 parts by weight of the polyolefin, of a grafted unsaturated carboxylic acid;
   (b) no more than 10 weight %, based on the weight of said modified polyolefin, of a polyfunctional epoxide, polyfunctional amine, polyfunctional isocyanate or mixtures thereof with the proviso that the amount of any given polyfunctional agent is within the range of 0.03 to 5 wt. %; and
   (c) from 5 to 400 wt. % of a reinforcing material, based on the weight of the modified polyolefin, of (i) a fibrous material selected from the group of glass fibers, carbon fibers, graphite fibers, aromatic polyamide fibers, silicon carbide fibers, polysulfone fibers, polyether ketone fibers, alumina fibers, potassium titanate fibers, asbestos fibers, boron fibers or metal fibers; or (ii) powdery or flaky materials selected from the group consisting of glass flakes, talc, mica, kaolin, clay, diatomaceous earth, calcium carbonate, calcium sulfate, magnesium oxide, carbon black, titanium oxide, powdered metal, alumina, graphite, white carbon, wollastonite, molybdenum disulfide and tungsten disulfide.

2. The composition of claim 1, wherein the modified polyolefin is prepared by reacting a polyolefin and said unsaturated carboxylic acid in the presence of at least one catalyst selected from the group consisting of ketal peroxides and dialkyl peroxides which have a decomposition temperature necessary for attaining the half life of 10 hours of at least 80° C.

3. The composition of claim 1, wherein the modified polyolefin is prepared by reacting a polyolefin and said unsaturated carboxylic acid in the presence of a mixed catalyst system comprising at least one member selected from the group consisting of ketal peroxides and dialkyl peroxides which have a decomposition temperature necessary for obtaining the half life of 10 hours of at least 80° C., and benzoyl peroxide.

4. The polyolefin resin composition of claim 3, wherein the weight ratio of said at least one member selected from the group consisting of ketal peroxides and dialkyl peroxides to benzoyl peroxide in the mixed catalyst system is 1/10 to 1/1.

5. The polyolefin resin composition of claim 1, wherein the modified polyolefin is prepared by heat-melting the unsaturated carboxylic acid, the polyolefin, and the polyfunctional compound in the presence of a peroxide type catalyst.

6. The composition of claim 5, wherein the modified polyolefin is prepared by extruding the reactants which form the same from an extruder type reactor.

7. The polyolefin resin composition of claim 2, wherein the ketal or dialkyl peroxide catalyst is at least one member selected from the group consisting of 1,1-bis(t-butylperoxy)-3,3,5-trimethylcyclohexane, 1,1-bis(t-butylperoxy)cyclohexane, n-butyl 4,4-bis(t-butylperoxy)valerate, 2,2-bis(t-butylperoxy)butane, 2,2-bis(t-butylperoxy)octane, di-t-butyl peroxide, t-butylcumyl peroxide, dicumyl peroxide $\sim,\sim'$-bis(t-butylperoxyisopropyl)benzene, and 2,5-dimethyl-2,5-di(t-butylperoxy)hexyne-3.

8. The composition of claim 3, wherein the modified polyolefin is in the form of spherulites of a size of 50μ or less.

9. The composition of claim 1, wherein the polyfunctional compound is a polyepoxide having an isocyanurate or cyanurate ring.

10. The composition of claim 1, wherein the improvement ratio of the strength of a molded product prepared from a composition consisting of the modified polyolefin and said reinforcing material to that of a molded product prepared from a polyolefin resin composition consisting of an unmodified polyolefin and said reinforcing material is at least 1.5.

11. The composition of claim 1, wherein said polyfunctional epoxide is a bisphenol A epoxy compound, a bisphenol F epoxy compound, an aliphatic ether epoxy compound, a novolak epoxide or an isocyanurate epoxide.

12. The composition of claim 1, wherein said polyfunctional amine is hexamethylene diamine, tetramethylene diamine, methaxylene diamine, diamino diphenylmethane, diaminodiphenyl sulfone, 3,3'-diaminobenzidine, isophthalic acid hydrazide, diamino diphenyl ether, nanomethylenediamine or diethylenetetramine.

13. The composition of claim 1, wherein said polyfunctional isocyanate is tetramethylene diisocyanate, toluidine diisocyanate, diphenylmethane diisocyanate, naphthalene diisocyanate or a polyisocyanate obtained by extending a diisocyanate compound with a chain extending agent.

14. A polyolefin resin composition comprising:
   (a) a polyolefin selected from the group consisting of polyethylene, polypropylene, poly(4-methylpentene-1), ethylene/vinyl acetate copolymer, ethylene/ethylacrylate copolymer, and ethylene/propylene/diene copolymer modified with from 0.05 to 0.8 parts by weight per 100 parts by weight of the polyolefin, of a grafted unsaturated carboxylic acid;
   (b) no more than 10 weight %, based on the weight of said modified polyolefin, of a polyfunctional epoxide, polyfunctional amine, polyfunctional isocyanate or mixtures thereof with the proviso that the amount of any given polyfunctional agent is within the range of 0.03 to 5 wt. %; and
   (c) from 5 to 400 wt. % of a reinforcing material, based on the weight of the modified polyolefin, of (i) an inorganic fiber or (ii) at least one member selected from the group consisting of glass flakes, talc, calcium carbonate, magnesium oxide, clay, mica and carbon black or (iii) an aromatic polyamide fiber.

15. The composition of claim 14, wherein the reinforcing material is carbon fiber.

* * * * *